US008472162B2

(12) United States Patent
Lang

(10) Patent No.: US 8,472,162 B2
(45) Date of Patent: Jun. 25, 2013

(54) MULTILAYERED ELECTROCHEMICAL ENERGY STORAGE DEVICE AND METHOD OF MANUFACTURE THEREOF

(75) Inventor: Joel Lang, Givataim (IL)

(73) Assignee: Cellergy Ltd., Rishon-Letzion (IL)

( * ) Notice: Subject to any disclaimer, the term of this patent is extended or adjusted under 35 U.S.C. 154(b) by 697 days.

(21) Appl. No.: 11/989,326

(22) PCT Filed: Jul. 27, 2006

(86) PCT No.: PCT/IL2006/000870
§ 371 (c)(1),
(2), (4) Date: Mar. 12, 2009

(87) PCT Pub. No.: WO2007/013077
PCT Pub. Date: Feb. 1, 2007

(65) Prior Publication Data
US 2009/0201629 A1 Aug. 13, 2009

(30) Foreign Application Priority Data
Jul. 27, 2005 (IL) .......................................... 169932

(51) Int. Cl.
*H01G 9/00* (2006.01)
(52) U.S. Cl.
USPC ....................................................... 361/502
(58) Field of Classification Search
USPC ........................................ 361/502; 29/25.03
See application file for complete search history.

(56) References Cited

U.S. PATENT DOCUMENTS

| 3,648,126 | A | * | 3/1972 | Boos et al. ..................... 361/502 |
|---|---|---|---|---|
| 4,542,444 | A | * | 9/1985 | Boland .......................... 361/502 |
| 4,697,224 | A | * | 9/1987 | Watanabe et al. ............. 361/502 |
| 5,172,307 | A | | 12/1992 | Tabuchi et al. |
| 5,219,673 | A | * | 6/1993 | Kaun ............................. 429/458 |
| 6,198,620 | B1 | * | 3/2001 | Wei et al. ....................... 361/502 |
| 6,212,062 | B1 | | 4/2001 | Day et al. |
| 6,773,468 | B2 | * | 8/2004 | Lang ............................ 29/25.03 |
| 6,965,509 | B2 | * | 11/2005 | Reynolds et al. ............. 361/528 |
| 7,147,674 | B1 | * | 12/2006 | Zhong et al. ................. 29/25.03 |

FOREIGN PATENT DOCUMENTS

| JP | 03094410 A | * | 4/1991 |
|---|---|---|---|
| JP | 03104107 A | * | 5/1991 |
| WO | WO 03/071563 A1 | | 8/2003 |

OTHER PUBLICATIONS

International Search Report for PCT/IL2006/000870 mailed Feb. 19, 2007.
Written Opinion of the International Searching Authority for PCT/IL2006/000870.

* cited by examiner

*Primary Examiner* — David M Sinclair
(74) *Attorney, Agent, or Firm* — Nixon & Vanderhye P.C.

(57) ABSTRACT

An energy storage device comprising one or more cells, wherein each cell is defined by a pair of electrodes and a separator placed therebetween, wherein each cell is bounded by two current collectors, the geometric form and size of said separator being identical to the form and size of said current collectors, and wherein in each cell, one electrode is printed on one of said two current collectors and the other electrode is printed on one face of the separator, the two electrodes being electronically insulated by means of said separator, and wherein the peripheral region of the separator, which surrounds the electrode printed thereon, is sealed.

18 Claims, 4 Drawing Sheets

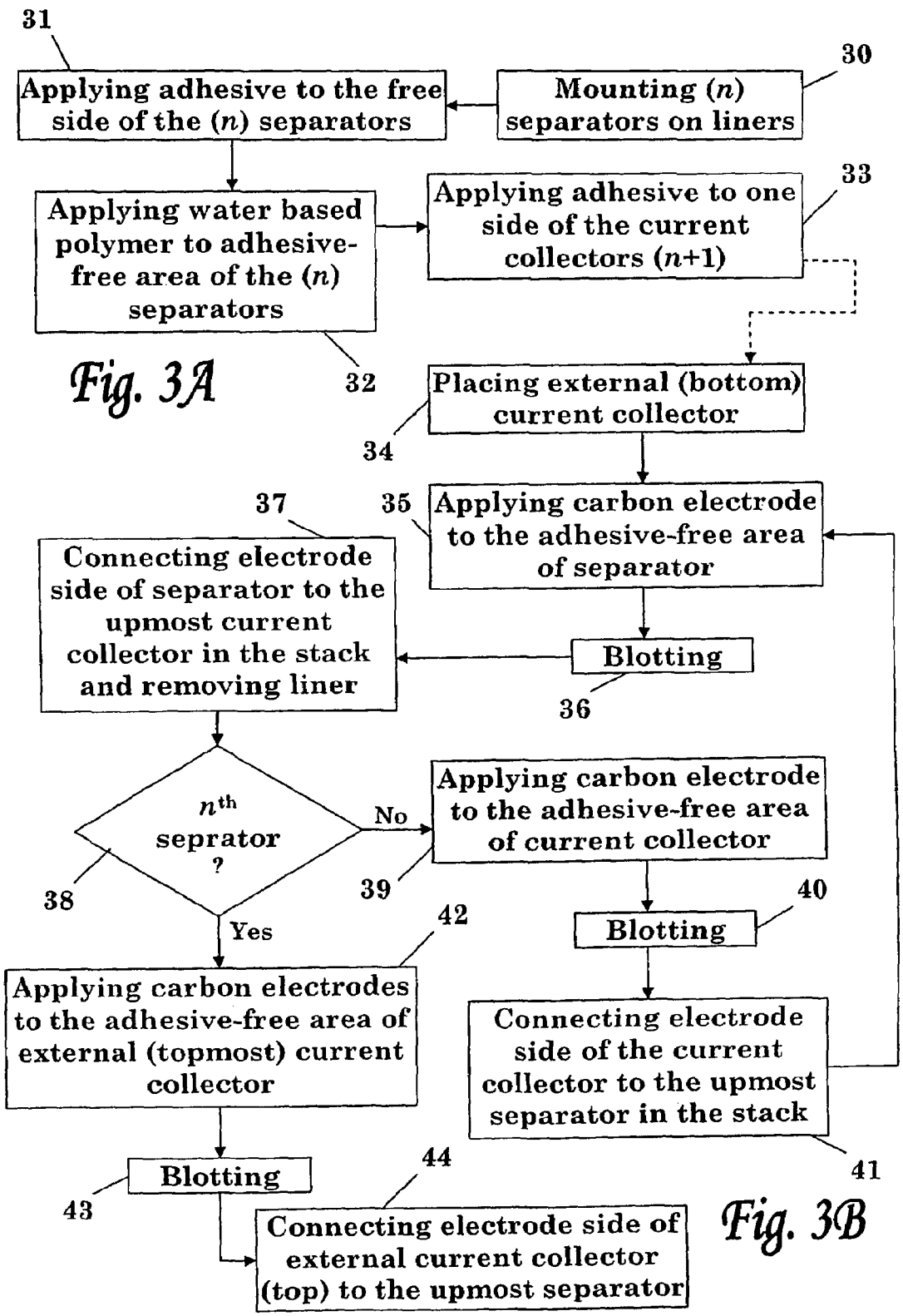

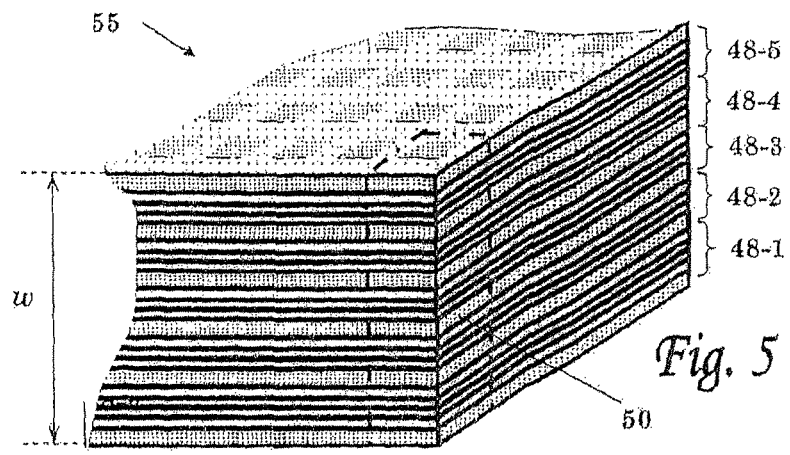
Fig. 5
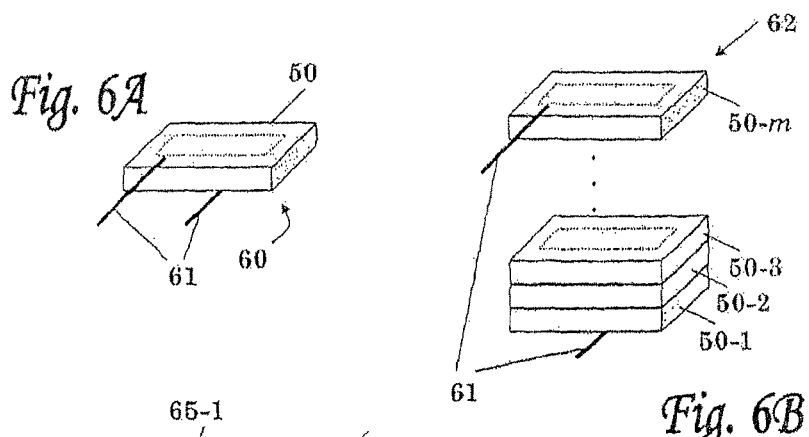
Fig. 6A
Fig. 6B
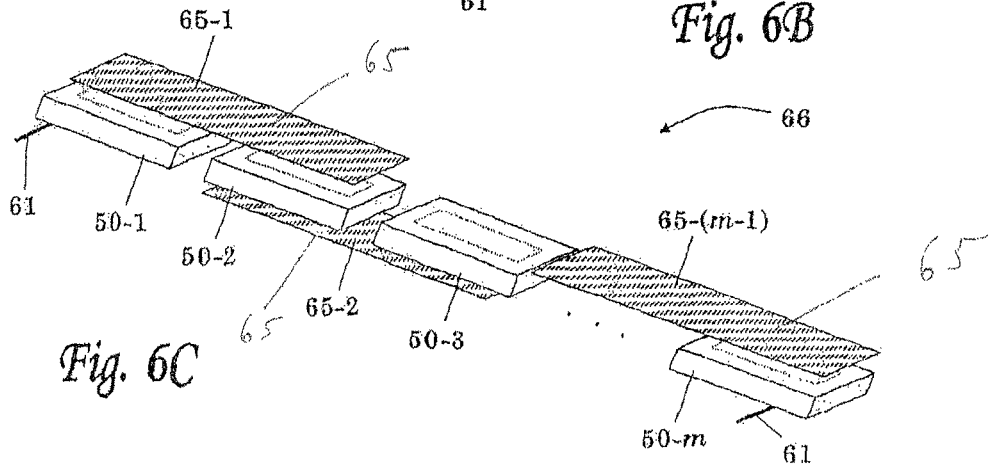
Fig. 6C

MULTILAYERED ELECTROCHEMICAL ENERGY STORAGE DEVICE AND METHOD OF MANUFACTURE THEREOF

This application is the U.S. national phase of International Application No. PCT/IL2006/000870, filed 27 Jul. 2006, which designated the U.S. and claims priority to Israel Patent Application No. 169932, filed 27 Jul. 2005, the entire contents of each of which are hereby incorporated by reference.

FIELD OF THE INVENTION

The present invention relates to energy storage devices, and specifically, to a multilayered electrochemical energy storage devices and to a method for manufacturing the same. More particularly, the invention relates to a method for manufacturing multilayered electrochemical capacitors or batteries comprising printable electrodes.

BACKGROUND OF THE INVENTION

A single cell energy storage device typically consists of two conducting plates (hereinafter current collectors) and an electronically insulating layer (dielectric, hereinafter separator) disposed therebetween. Electrodes are usually disposed between the current collectors and the separator and a liquid electrolyte (e.g., sulfuric acid) contained therein is used as a charge accumulation interface.

Electrochemical energy storage devices (e.g., primary or secondary batteries, electrochemical cells such as fuel cells) are generally divided into two distinct categories, according to the type of electrolyte used for preparing the electrode, which may be either an aqueous or organic electrolyte solution. The former type may generate up to 1.2 volt per cell, whereas the latter type typically provides about 2.5 to 4.0 volts per cell. The operating voltage of electrochemical energy storage devices may be increased by assembling a plurality of the individual cells described above in series, to obtain an arrangement known in the art as a bipolar cell (e.g., bipolar capacitor).

U.S. Pat. No. 6,212,062 describe the construction of a multi layered capacitor cell wherein carbon electrodes are disposed on the current collectors of the cell.

WO 03/071563 describes an electrochemical energy storage device comprising double layered electrochemical cells and a method for manufacturing the same. In this electrochemical energy storage device, the electrode are printed on the current collectors of the cells and a separating medium is disposed therebetween, wherein the pores of said separating medium in the regions corresponding to the non-printed regions on the current collector (i.e., complementary to the region including the printed electrode) are blocked by a layer of adhesive or other polymer.

According to these methods construction of a bipolar energy storage device consisting from a stack of energy storage cells involves providing electrodes on both sides of each internal current collector in the stack, and one electrode in, contact with the inner face of the two external current collectors (the current collectors placed at the top and the bottom of the stack). This construction is cumbersome due to this electrode arrangement wherein two electrodes are provided on the two sides of each internal current collector of the bipolar energy storage device. Moreover, the sealing and packaging of such cell stacks is not a simple task and the width of their multilayered structure is relatively large.

It is an object of the present invention to provide a simplified multilayered energy storage device construction wherein electrodes may be printed on one side of each current collector.

It is another object of the present invention to provide an improved process for the manufacture of bipolar energy storage devices based on a multi layered stack.

It is a further object of the present invention to provide a method for manufacturing a plurality of energy storage devices stacks wherein an individual energy storage device can be easily cut out by scissors or knife or other mechanical means.

Other objects and advantages of the invention will become apparent as the description proceeds.

SUMMARY OF THE INVENTION

The terms "separator" or "separating medium" are interchangeably used herein to describe all thin porous films or membranes commonly used to electronically separate between electrodes in an electrochemical cell. It has now been found that it is possible to seal the pores of the separator in the peripheral region thereof, forming one or more non-sealed regions thereon according to a desired pattern, and then to directly print electrodes onto said one or more non-sealed regions of the separator. The resultant construct, namely, a separator having one or more electrodes printed thereon, such that each electrode is surrounded by a sealed region of the separator, may be effectively used in the preparation of multilayered structures that may serve, inter alia, as bi-polar electrochemical capacitors.

Accordingly, the present invention provides an energy storage device comprising one or more cells, wherein each cell is defined by a pair of electrodes and a separator placed therebetween, wherein each cell is bounded by two current collectors, the geometric form and size of said separator being identical to the form and size of said current collectors, and wherein in each cell, one electrode is printed on one of said two current collectors and the other electrode is printed on one face of the separator, the two electrodes being electronically insulated by means of said separator, and wherein the peripheral region of the separator, which surrounds the electrode printed thereon, is sealed.

The term "sealed" is used to indicate that the region is non-permeable to the electrolyte contained in the electrode; the sealed region surrounding the electrode printed on the separator prevents the seepage of the electrolyte from the electrode to the circumferential region of the cell. According to one preferred embodiment, the sealed peripheral region of the separator, which surrounds the electrode printed thereon, is impregnated with an electrically non-conductive material, preferably an adhesive, which blocks the pores of the separator in said region and also allows the attachment of the separator to the current collectors.

The number of cells in the energy storage device, hereinafter sometimes designated n, is an integer equal to or greater than 1, and is preferably, in the range of 2 to 100, and more preferably, in the range of 3 to 20, and most preferably 3 to 10. When the energy storage device of the invention comprises more than one cell, said cells are electrically connected in serial in a stack structure, with adjacent cells sharing the same current collector. Accordingly, in this arrangement, the number of current collectors equals n+1, of which two may be referred to as external current collectors. The external current collectors may differ in composition and thickness from the internally positioned current collectors, and from one another.

It has now been made possible to considerably simplify the construction of an energy storage device having the arrangement descried hereinabove (e.g., a bi-polar electrochemical capacitor), in view of the fact that one of the two electrodes placed in each cell may be directly printed onto the surface of the separator. Accordingly, the present invention is also directed to a method for preparing a multilayered structure, which structure comprises one or more energy storage devices, each of which containing n cells, as described above, wherein the method comprises:

providing n+1 current collectors and n separators, sealing the pores in the peripheral area in each of said n separators, thus forming one or more discrete non-sealed regions in each of said separators, printing electrodes onto said one or more non-sealed regions of each of said separators, printing one or more electrodes on one side of each of n current collectors selected from the n+1 current collectors, such that each of said n current collectors has only one face with electrode(s) deposited thereon, alternately arranging said n+1 current collectors and said n separators to form a multilayered structure. In this multilayered structure, the current collector having no electrode(s) deposited thereon is, most simply, externally positioned.

Most preferably, the discrete electrode regions printed on each of the n separators correspond in number, size, form and position to the electrodes printed on each of the n current collectors, such that said multilayered structure is constructed by the apposition of said electrodes.

Most preferably, the sealing is accomplished by applying on one side of each of said n separators an electrically non-conducting material such that said non-conducting material seals the pores of said separator in the peripheral area thereof, whereby one or more non-sealed regions are formed in said separator. As explained above, the electrodes are printed onto these non-sealed regions of the separator.

The multilayered structure obtained by the method described above is a spatial body, typically having a shape of a rectangular parallelepiped. The height of this body is determined by the number of the vertically aligned layers (the n+1 current collectors and the n separators). The number of the individual energy storage devices that may be isolated from the multilayered structure depends on the number of discrete electrodes distributed on the surface of the n current collectors and the corresponding number of discrete electrodes printed on the surface of the separators. Thus, a plurality of individual energy storage devices, each of which comprises n vertically aligned cells, may be conveniently isolated from the multilayered structure by scissors, cutter, knife, or other mechanical means.

Preferably, the method further comprises initially mounting each of the separators on a support, before the sealing and printing thereon, which support is detached from the separator after placing said separator in the multilayered structure.

The method may further comprise a step wherein excess electrolyte is removed from the printed electrodes, where said removal is preferably accomplished by drying the electrodes and/or absorbing said excess electrolyte therefrom by means of an absorbent placed on the electrodes. Slight pressure may be applied, to facilitate the absorbance of the excess electrolyte from the printed electrodes.

The term "printing" or "printed" and the like, as used herein, refer to known printing techniques, such as, but not limited to, screen-printing, stencil printing, ink jet printing and any other form of transferring a paste-like material or ink-like material onto a substrate.

BRIEF DESCRIPTION OF THE DRAWINGS

In the drawings:
FIGS. 3A-3B are flowcharts illustrating the process of preparation of the current collectors and the separators, and the stacking of the same in a bipolar construction;
FIG. 5 schematically illustrates a structure comprising a plurality of energy storage devices each of which comprising 5 electrochemical cells;
and
FIGS. 6A-6C shows a single cell capacitor product and a multiple parallel and serial cell capacitor products.

DETAILED DESCRIPTION OF PREFERRED EMBODIMENTS

The present invention is directed to a multilayered energy storage device and to a method of its manufacture. More particularly, the present invention is directed to a bipolar capacitor constructed from a stack of n+1 current collectors and n separators disposed therebetween, wherein an electrode is attached to n current collectors and n separators (wherein n is an integer, n>=1) of the stack.

Current collectors to be used according to the present invention are made of a conductive material that is chemically inert to the aqueous electrolyte contained in the electrode. The current collector may be provided in the form of a metal foil, such as aluminum foil, plated metal or metal coated with a protective oxide. Alternatively, the current collector is a polymeric or a co-polymeric sheet, such as polyethylene or polytetrafluoroethane (Teflon), rubber or PVC (polyvinylchloride) loaded with conductive particles such as carbon black, graphite, metallic or plated metallic particles. In another embodiment, the current collector has a multilayer structure comprising alternating layers of suitable polymers, metal foils and carbon or graphite, or similar combinations. The thickness of the current collector is preferably in the range of 10 μm to 150 μm.

The external current collectors (uppermost and bottommost current collectors in the multilayered structure) are preferably made of a metallic foil covered by at least one corrosion resistant layer (e.g., carbon and/or suitable conductive polymeric composition). The surface of the metallic foil is preferably roughened (e.g., by metal deposition, sputtering, electronic deposition, or mechanical roughening or chemical etching). The term "rough surface" is used throughout the specification to indicate roughness that is due to small irregularities of the surface, which are intended to maximize the contact between the metallic foil and the corrosion resistant layers applied thereon. The internal current collectors may be either metallic, or alternatively be made of polymeric sheets or metal sheets coated with polymers, as described above.

The electrodes may comprise carbon, graphite, carbon nano-particles, fullerene, hollow graphite tubes, metallic particles, particles of metal oxides and/or metal salts, electrically conductive polymers, quinones and their derivatives, ketone compounds, multivalent oxidation compounds, clays, intercelation compounds, ceramic oxides, and mixtures thereof. The electrode may contain aqueous electrolyte (acidic, alkaline, or neutral), and binders (organic or inorganic), and other additives. The electrode may be in the form of a foil, a clothe or a dense powdered structure.

Figures 1A, 1B:
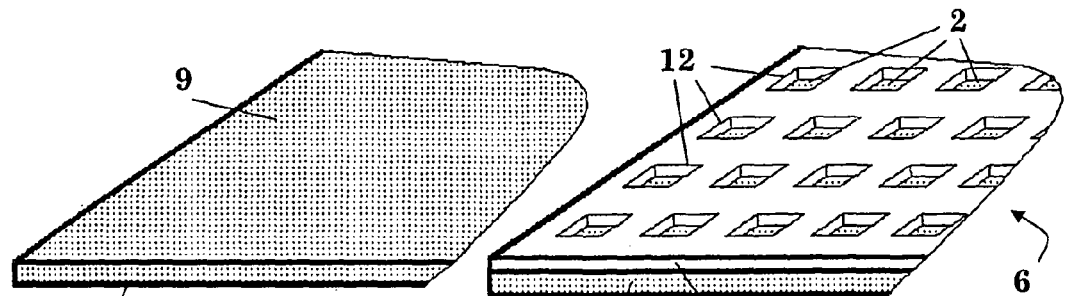
FIGS. 1A-1C schematically illustrates the preparations of the inner and the top (external) current collectors of the bipolar energy storage device stack of the invention.
Figure 1C:
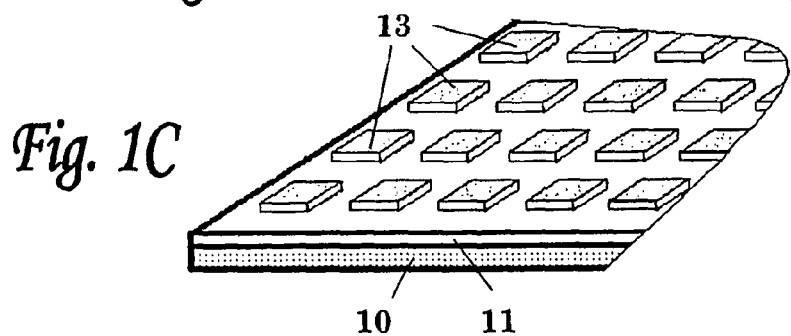
Figures 2A, 2B:
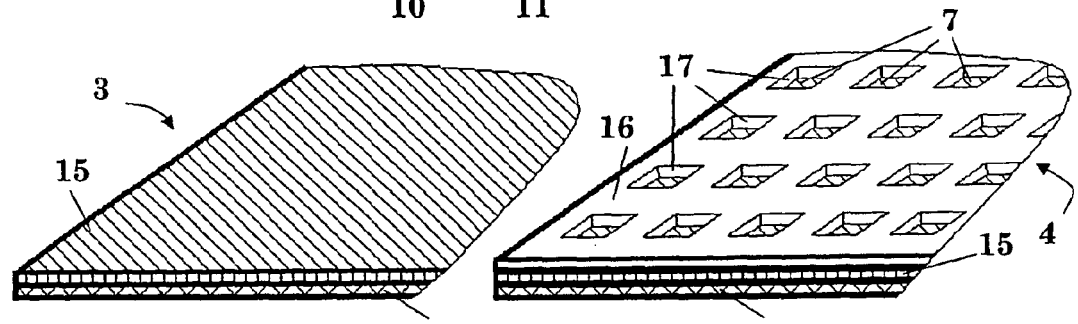
FIGS. 2A-2D schematically illustrates the preparations of the separators of the bipolar energy storage device of the invention.
Figures 2C, 2D:
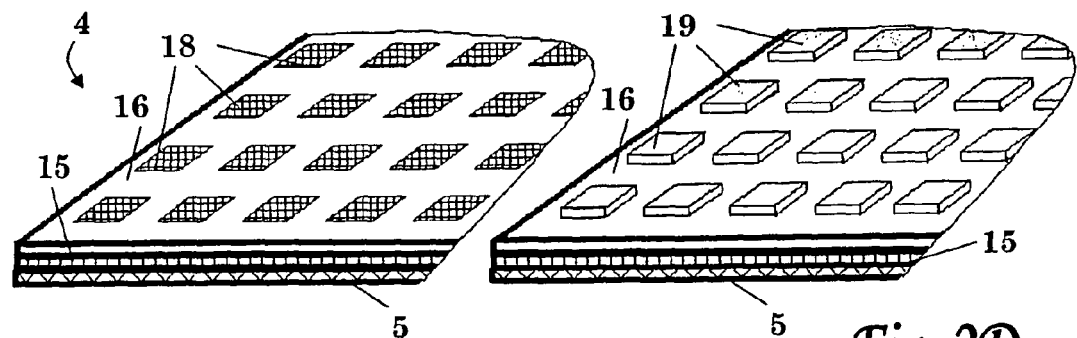

FIG. 3A is a flowchart illustrating the preliminary steps of preparing the current collectors and the separators for the bipolar capacitor of the invention, as also schematically illustrated in FIGS. 1A-1C and 2A-2D. The process starts in step 30 wherein n separators 15 are mounted on n liners 5 (FIG. 2A). The separators 15 may be provided by a permeable membrane (e.g., polyethylene, Polytetrafluoroethylene, olefins, polyvinylidene fluoride (commercially available as Kynar®); most preferably, the separators are provided by a porous film. For example, according to one preferred embodiment the mounted separators 3 are prepared from a 25 micron thick teflon based material and mounted on a 150 micron thick silicone liners by means of conventional lamination techniques. The mounting of the separator medium 15 on the liner is required in order to prevent the occurrence of folds and/or collapse of the separator during the further steps of the process.

Next, in step 31, the mounted separators 3 are coated by a layer of adhesive 16, such that separator 15 is sandwiched between the liner 5 and the adhesive layer 16. Adhesive layer 16 is preferably applied via a template (not shown) for providing complete coverage of the circumferential area of the mounted separator 3 by adhesive and for leaving adhesive-free regions 17 through which separators regions 7 may be accessed (FIG. 2B). In this way the pores in those regions of the separator medium 15 to which adhesive layer 16 is applied are blocked by the adhesive.

This step may be carried out utilizing printing techniques, as described in WO 03/071563. The adhesive used for coating separator 15 may be a type of solvent based pressure sensitive adhesive, UV based pressure sensitive adhesive, UV based heat activated adhesive, solvent based heat activated pressure sensitive adhesive, molten pressure sensitive adhesive, molten heat activated adhesive, or any other polymer with adhesive characteristics. For example, the adhesive may be C-70 manufactured by Coates.

According to one preferred embodiment of the invention a 15-30 micron thick layer of adhesive is applied to an $120 \times 10^5$ mm mounted separator 3 via a suitable template by means of screen-printing for providing 7 rows and 8 columns of (e.g., rectangular) adhesive-free regions 17 of a bout 6-100 $mm^2$. The coated separator 4 is then dried of the adhesive solvent. The drying may be carried out, for example, by passing it through a common heat drying tunnel, or any other drying process, such as a static or a convection drying processes, at room temperature or at elevated temperature. Step 31 may be repeated if additional adhesive layers are needed in order to achieve a thicker layer of adhesive 16 on the coated separator 4.

In step 32 a water based polymer 18 (FIG. 2C) is applied to the adhesive-free regions 17 of the coated separator 4. The water based•polymer 18 provides improved shelf life to the final product. The water based polymer 18 may be a single blend or multi-blend of water based polymers, such as PVA (polyvinyl alcohol), PAA (polyacrylic acid), PEO (polyethylene oxide), PEI (polyethylene imide), imidazole, or other water based polymer or copolymer. The vehicle used to carry the water soluble polymer may further include organic or inorganic additives, such as surfactants and thickeners. The solution used in this step may be water based or a composition of water and organic solution or even organic solutions such as ethanol, isopropanol or a combination thereof. The water based polymer 18 may be applied by means of screen-printing. Preferably, a layer of 10-30 micron thick of water based polymer 18 is printed into the adhesive-free regions 17, thereby filling the pores of the accessible separator regions 7. If needed, the applied water based polymer 18 is dried, for example, by passing it through a common heat drying tunnel or any other drying process, such as a static or a convection drying processes, at room temperature or at elevated temperature. This step (32) may be repeated, if needed, in order to provide additional polymer composition 18 in the pores of the accessible separator regions 7.

Next, or concurrently to steps 30-32, in step 33 the surface 9 of one of the sides of each current collector 10 is coated by a layer of adhesive 11 (FIGS. 1A and 1B). Adhesive layer 11 is preferably applied via a template (not shown) for providing complete coverage of the circumferential area of the current collector 10 by adhesive and for leaving adhesive-free regions 12 through which current collector regions 2 may be accessed (FIG. 1B). The location and area of the adhesive-free regions 12 of the coated current collector 6 substantially corresponds to the location and area of the adhesive-free regions 17 of the coated separator 4.

Similarly, this step may be carried out utilizing common printing techniques. The adhesive used for coating current collector 10 may be a type of solvent based pressure sensitive adhesive, UV based pressure sensitive adhesive, UV based heat activated adhesive, solvent based heat activated pressure sensitive adhesive, molten pressure sensitive adhesive, molten heat activated adhesive, or any other polymer with adhesive characteristics. For example, the adhesive may be C-70 by coates.

The separator mediums 15 and the current collectors 10 are substantially of the same spatial dimensions.

For example, in one preferred embodiment of the invention the external current collectors are manufactured from a 4-100 micron metallic foil.

Each of the external current collectors may be manufactured from a different material, and the width of one, or both, external current collector(s) may be thicker than the width of the internal current collectors. Alternatively or additionally, the inner side (i.e., the side facing a separator medium) of at least one of the external current collector, manufactured from any suitable electrically conductive material such as discussed above, may be covered with one or more materials for rendering its surface more resistant to the seepage of the electrolyte. For example, the inner side of the external current collector(s) may be covered by a non-metallic yet conductive polymer material (e.g., Baytron®) or titanium oxide.

The internal current collectors (e.g., 45-2 in FIG. 4) may be manufactured from carbon and polymer plates, or from a suitable corrosion durable metallic foil. Most preferably the external current collectors are in the form of a metallic foil of about 6-20 microns thickness, made of copper, nickel or nickel-coated copper (which are commercially available), covered by one or more corrosion resistant layers (made of carbon and/or suitable polymeric compositions), the thickness of said layer(s) being in the range of 30-150 micron; preferably a layer of about 100 micron thickness is applied onto said foil. The corrosion resistant layer may be attached to the metallic foil via a corrosion resistant electrically conducting adhesive layer (e.g., 5-40 micron). The surface of the metallic foil is preferably roughened in order to maximize the contact between the corrosion resistant layer and the surface of the metallic foil. The roughening of the metallic foil surface may be obtained for example by metal deposition, sputtering, electronic deposition, or mechanical roughening or chemical or etching.

According to one preferred embodiment of the invention a 15-30 microns thick layer of adhesive is applied to an ~10.5× 15 mm current collector 10 with thickness of about 30-70 micron, via a suitable template by means of screen-printing for providing 12 rows and 12 columns of (e.g., rectangular) adhesive-free regions 12 of a bout 10×10 mm. The coated current collector 6 is then dried of the adhesive solvent. The drying may be carried out, for example, by passing it through a common heat drying tunnel, or any other drying process, such as a static or a convection drying process, at room temperature or at elevated temperature. This step (33) may be repeated if additional adhesive layers are needed in order to achieve a thicker layer of adhesive 11 on the coated current collector 6.

Figure 4:
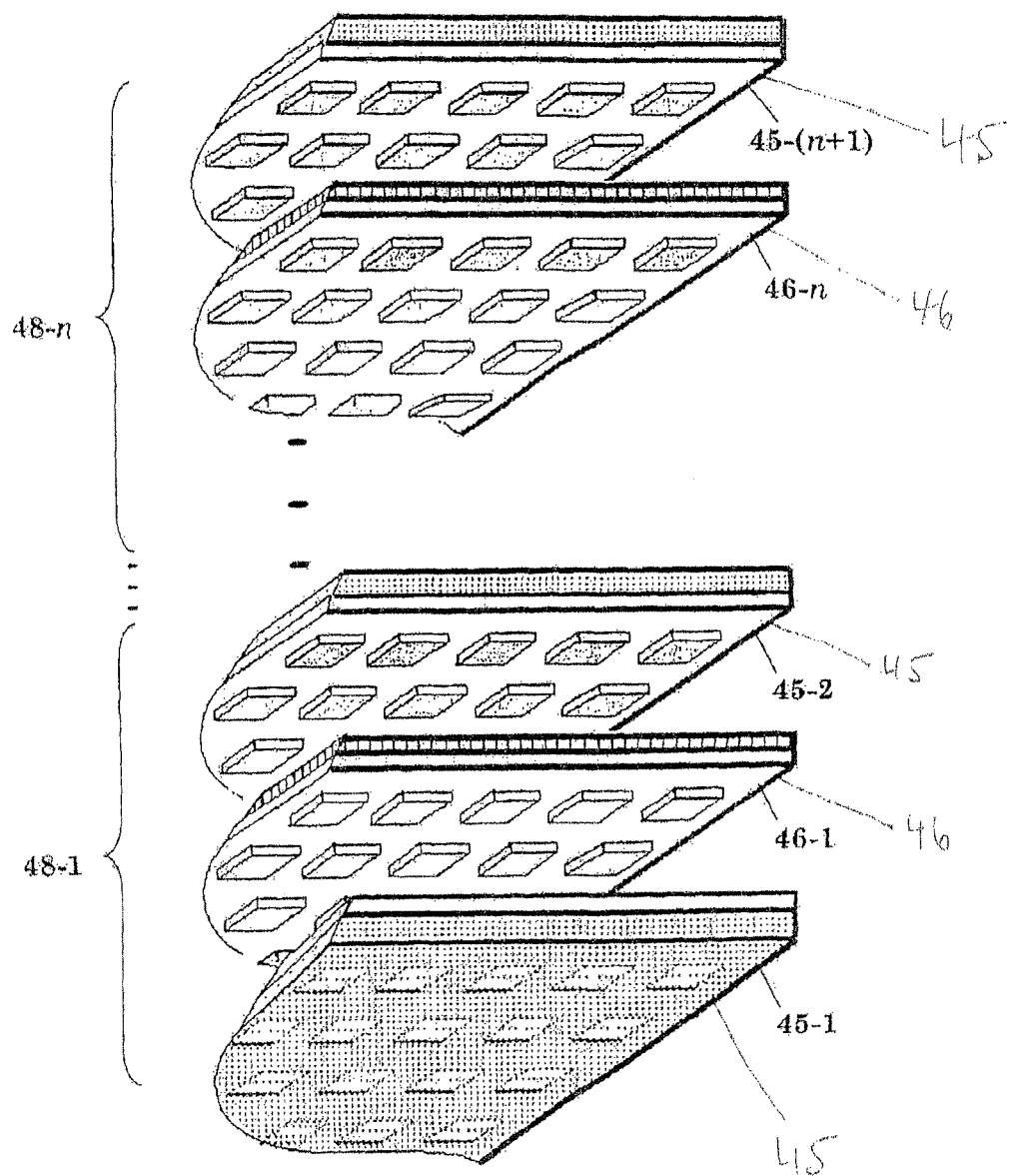
FIG. 4 schematically illustrates construction of a bipolar energy storage device comprising n cells.

FIG. 3B is a flowchart demonstrating the steps of constructing an energy storage device according to the invention, as also demonstrated in FIG. 4. The first layer of the stack is placed in step 34, wherein the bottom layer of the stack 45-1 (FIG. 4), an external current collector, is placed such that its coated surface 9 is directed upwardly. In step 35 electrodes 19 (FIG. 2D) are applied to the adhesive-free regions 17 of the coated separator 4. Electrodes 19 may be prepared utilizing conventional suitable electrode compositions, for example the carbon based compositions described in WO 03/071563 (which contain an aqueous electrolyte) and they are preferably applied via a suitable mesh No. 40-200 (e.g., such as, but not limited to, stainless steal mesh, coated stainless steal mesh, or polyester mesh) utilizing screen-printing techniques, or other techniques, such as stencil techniques. Such a mesh may be developed using suitable photo emulsion or other masking techniques, using as known by skilled in the art.

Preparation of a separator layer 46 is completed after applying electrodes 19 to the coated separator 4. In step 36 blotting, or other drying process, is (optionally) performed, wherein the electrodes are compressed and excess electrolyte is absorbed by an absorbent material. For example, a blotting material (not shown) is placed above electrodes 19 and a pressure is applied by a blotting method in order to remove the excess electrolyte which is absorbed in the blotting material. The blotting material is then removed from electrodes 19 and discarded. In step 37 the separator (e.g., separator 46-1 of the first cell 48-1 of n cells wherein the nth cell is 48-n) is placed on the stack such that the side containing electrodes 19 covers the upper side of the previously placed current collector (e.g., 45-1). The separator 46 is then attached to the current collector 45, for example, by welding them together at elevated temperature and pressure, at partial vacuum, or full vacuum. Welding may be performed via heat welding of the layers or impulse heat welding or other welding techniques. After attaching the separator 46 to the current collector 45 the liner 5 is removed from the upper side of the separator.

If it is determined in step 38 that the last separator layer (46-n) was placed in the stack in the previous step (37), then the process is finalized by carrying out steps 42-44. In step 42 electrodes 13 (FIG. 1C) are applied to the adhesive-free regions 12 of the coated current collector 6. Electrodes 13 preferably comprise the same ingredients as in electrodes 19, and they are preferably applied via a suitable mesh as in step 35. Preparation of the topmost (external) current collector 45-($n+1$) is completed after performing the (optional) blotting (or drying) step 43, wherein excess electrolyte is absorbed under pressure into a blotting material (not shown), as in step 36 above. Finally, in step 44, the topmost current collector 45-($n+1$) is placed on the last separator layer 46-$n$ in the stack, such that the side of the topmost current collector 45-($n+1$) containing the electrodes 13 covers the upper side of the previously placed separator layer 46-$n$.

The topmost current collector 45-($n+1$) is then attached to the previously placed separator layer 46-$n$, for example, by welding them together at elevated temperature and pressure, at partial vacuum, or full vacuum. Welding may be performed via heat welding of the layers or impulse heat welding or other welding techniques.

If it is determined in step 38 that additional cell layers should be added to the stack an internal current collector is prepared and placed in steps 39-41 and a new cell is then added by transferring the control to step 35. Preparation of the internal current collector (e.g., 45-2) includes applying electrodes 13 (step 39) to the adhesive-free regions 12 of a coated current collector 6, removing excess electrolyte in the (optional) blotting or drying step 40, and in step 41 connecting the internal current collector to the previously placed separator (e.g., 46-1) such that the side of the current collector containing the electrodes 13 covers the upper side of the previously placed separator layer. The internal current collector is then attached to the previously placed separator layer, for example, by welding them together at elevated temperature and pressure, at partial vacuum, or full vacuum. Welding may be performed via heat welding of the layers or impulse heat welding or other welding techniques.

FIG. 5 shows a multilayer construction of a stack 55 comprising numerous energy storage devices 50. In this example each energy storage device 50 is comprised of 5 cells (n=5), 48-1, 48-2, 48-3, 48-4, and 48-5. The width w of such a stack 55 when using 10-30 micron thick separator mediums 15 coated with a layer of glue of about 50-90 microns, and a 40-70 microns thick current collectors, coated with a layer of glue of about 5-40 micron, is about 1-1.2 mm. As exemplified above, this multilayer construction comprises 5 separators and 4 internal current collectors, each of which comprises electrodes, and 2 external current collectors, wherein only the topmost external current collector comprises electrodes. The energy storage devices 50 may be easily cut out of stack 55 by a scissors or a knife or other instrument.

It is of course possible to construct a similar multilayer stack wherein electrodes are also disposed on the external current collector at the bottom of the stack. In this case the separator placed on top of the external current collector at the bottom of the stack may be prepared and placed without carrying step 35, namely without applying electrodes to its adhesive-free regions.

FIG. 6A shows a single cell capacitor product 60. Capacitor 60 comprises a multilayered energy storage device 50 and two wire or flat cable leads 61 which are attached to the external current collectors of the multilayered energy storage device 50, preferably by welding or by utilizing conductive epoxy glue. FIG. 6B shows and an m-cell capacitor product 62, wherein a stack of m multilayered energy storage devices, 50-1, 50-2, 50-3, . . . 50-$m$, are stacked in series to form a parallel capacitor product 62. In the parallel capacitor product 62 lead wires 61 are attached to the (bottom) external current collector of the multilayered energy storage device 50-1 and to the (top) external current collector of the multilayered energy storage device 50-$m$.

FIG. 6C shows and an m-cell capacitor product 66, wherein m multilayered energy storage devices, 50-1, 50-2, 50-3, . . . 50-$m$, are connected in series to form a serial capacitor product 66. As shown, m−1 conducting mediums 65 (65-1, 65-2, . . . 65-($m$−1) in FIG. 6C, e.g., metallic foil) serially connects multilayered energy storage devices, 50-1, 50-2, 50-3, . . . 50-$m$, and lead wires 61 to current collectors of multilayered energy storage devices 50-1 and 50-$m$.

All of the abovementioned parameters are given by way of example only, and may be changed in accordance with the differing requirements of the various embodiments of the present invention. Thus, the abovementioned parameters should not be construed as limiting the scope of the present invention in any way.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. An energy storage device comprising one or more cells, wherein each cell is defined by a pair of electrodes and a separator placed therebetween, wherein each cell is bounded by two current collectors, the geometric form and size of said separator being identical to the form and size of said current collectors, and wherein in each cell, one electrode is printed on one of said two current collectors and the other electrode is printed on one face of the separator, said electrodes being either screen-printed electrodes, stencil-printed electrodes or inkjet-printed electrodes, the two electrodes being electronically insulated by means of said separator, wherein the peripheral region of the separator, which surrounds the electrode printed thereon, is sealed with an adhesive, and wherein said energy storage device further comprises a water based polymer in the adhesive-free region of said separator, onto which region said electrode is printed.

2. An energy storage device according to claim 1, wherein the sealed peripheral region of the separator, which surrounds the electrode printed thereon, is impregnated with an electrically non-conductive adhesive.

3. An energy storage device according to claim 1, which comprises a plurality of cells that are electrically connected in serial in a stack structure located between two external current collectors.

4. An energy storage device according to claim 3, which is a bi-polar electrochemical capacitor.

5. AN energy storage device according to claim 3, wherein the external current collectors are made of a metallic foil optionally covered by one or more corrosion resistant layers.

6. An energy storage device according to claim 5, wherein one or more of the corrosion resistant layers comprises carbon and/or conductive polymers.

7. An energy storage device according to claim 5, wherein the surface of the metallic foil is a rough surface having increased contact surface area.

8. An energy storage device according to claim 3, wherein the internal current collectors are made of conductive polymeric sheets, metal sheets or metal sheets coated with a conductive polymer.

9. An energy storage device according to claim 1, wherein the water-based polymer is a blend of poly vinylalcohol and poly acrylic acid.

10. A method for preparing a multilayered structure, which is an energy storage device comprising more than one cell, wherein the cells are electrically connected in serial in a stack structure, with adjacent cells sharing the same current collector, said method comprising: providing n+1 current collectors and n separators, sealing the pores in the peripheral area in each of said n separators, thus forming one or more discrete non-sealed regions in each of said separators, printing electrodes onto said one or more non-sealed regions of each of said separators, screen-printing, stencil-printing or inkjet-printing one or more electrodes on one side of each of n current collectors selected from the n+1 current collectors, such that each of said n current collectors has only one face with electrode(s) deposited thereon, alternately arranging said n+1 current collectors and said n separators to form a multilayered structure, wherein the method further comprises the step of applying a water-based polymer to the non-sealed regions of the separator prior to the electrode printing.

11. A method according to claim 10, wherein the discrete electrode regions printed on each of the n separators correspond in number, size, form and position to the electrodes printed on each of the n current collectors.

12. A method according to claim 10, wherein the sealing comprises applying on one side of each of said n separators an electrically non-conducting material such that said non-conducting material seals the pores of said separator in the peripheral area thereof, whereby one or more discrete non-sealed regions are formed in said separator.

13. A method according to claim 10, which further comprises initially mounting each of the separators on a support, before the sealing and printing thereon, which support is detached from the separator after placing said separator in the multilayered structure.

14. A method according to claim 10, which further comprises removing excess electrolyte from the printed electrodes.

15. A method according to claim 14, wherein said removing comprises drying the electrodes, and/or absorbing the electrolyte therefrom by means of an absorbent placed on said electrodes.

16. A separator suitable for use in electrochemical cells, which separator comprises a thin porous film or a membrane having one or more screen-printed electrodes, stencil-printed electrodes or inkjet-printed electrodes thereon, wherein each electrode is surrounded by a sealed region of the separator, the pores in said sealed region being impregnated with an electrically non-conductive adhesive, and wherein the separator further comprises a water based polymer in the adhesive-free regions of said separator, onto which adhesive-free regions said electrodes are printed.

17. A method according to claim 15, wherein said removing comprises drying the electrodes, and/or absorbing the electrolyte therefrom by means of an absorbent placed on said electrodes under pressure.

18. A separator according to claim 16, wherein the water-based polymer is a blend of poly vinylalcohol and poly acrylic acid.

* * * * *